US012581431B2

(12) United States Patent
Yang et al.

(10) Patent No.: US 12,581,431 B2
(45) Date of Patent: Mar. 17, 2026

(54) PHR REPORTING METHOD, PHR RECEIVING METHOD, TERMINAL, AND NETWORK DEVICE

(71) Applicant: VIVO MOBILE COMMUNICATION CO., LTD., Dongguan (CN)

(72) Inventors: Ang Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 528 days.

(21) Appl. No.: 17/901,823

(22) Filed: Sep. 1, 2022

(65) Prior Publication Data

US 2022/0417870 A1 Dec. 29, 2022

Related U.S. Application Data

(63) Continuation of application No. PCT/CN2021/078400, filed on Mar. 1, 2021.

(30) Foreign Application Priority Data

Mar. 6, 2020 (CN) .......................... 202010152863.6

(51) Int. Cl.
| | |
|---|---|
| *H04W 72/12* | (2023.01) |
| *H04W 52/32* | (2009.01) |
| *H04W 52/36* | (2009.01) |

(52) U.S. Cl.
CPC ....... *H04W 52/365* (2013.01); *H04W 52/325* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 2015/0215943 A1 | 7/2015 | Vajapeyam et al. | |
| 2018/0014255 A1* | 1/2018 | Pelletier .............. | H04W 52/365 |

FOREIGN PATENT DOCUMENTS

| | | | | |
|---|---|---|---|---|
| CN | 102316481 A | 1/2012 | | |
| CN | 104936222 A | 9/2015 | | |
| CN | 105873213 A | 8/2016 | | |
| EP | 3091809 A1 | 11/2016 | | |
| WO | 2015116866 A1 | 8/2015 | | |
| WO | WO-2015113232 A1 * | 8/2015 | .......... | H04W 52/365 |
| WO | 2019160474 A1 | 8/2019 | | |

OTHER PUBLICATIONS

International Search Report issued in corresponding International Application No. PCT/CN2021/078400, mailed May 25, 2021, 4 pages.
Extended European Search Report issued in related European Application No. 21765359.1, mailed Jul. 14, 2023, 10 pages.
Office Action issued in related European Application No. 21765359.1, mailed Oct. 14, 2025, 7 pages.

* cited by examiner

*Primary Examiner* — Gary Lafontant
(74) *Attorney, Agent, or Firm* — IPX PLLC

(57) ABSTRACT

A Power Headroom Report (PHR) reporting method, a PHR receiving method, a terminal, and a network device are provided. The method includes: reporting a PHR in a case that a preset reporting trigger condition is satisfied. The PHR includes a Power Headroom (PH) of a network node. The network node includes a neighboring network node, or a local network node and a neighboring network node.

20 Claims, 4 Drawing Sheets

12

Network device

11

Terminal

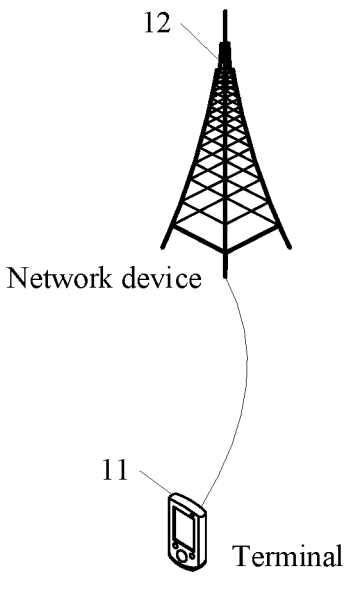

12

Network device

11

Terminal

FIG. 1

| Report a PHR in a case that a preset reporting trigger condition is satisfied, the PHR including a PH of a network node, the network node including a neighboring network node, or the network node including a local network node and a neighboring network node |

| Report a PHR in a case that a preset reporting trigger condition is satisfied |

| Receive a PHR reported by a terminal in a case that a preset reporting trigger condition is satisfied, the PHR including a PH of a network node, the network node including a neighboring network node, or the network node including a local network node and a neighboring network node |

PHR REPORTING METHOD, PHR RECEIVING METHOD, TERMINAL, AND NETWORK DEVICE

CROSS-REFERENCE TO RELATED APPLICATIONS

This application is a continuation of International Application No. PCT/CN2021/078400, filed on Mar. 1, 2021, which claims priority to Chinese Patent Application No. 202010152863.6 filed on Mar. 6, 2020. The entire contents of each of the above-referenced applications are expressly incorporated herein by reference.

TECHNICAL FIELD

The present disclosure relates to the field of communication technologies, and in particular, to a Power Headroom Report (PHR) reporting method, a PHR receiving method, a terminal, and a network device.

BACKGROUND

As is known to all, in a New Radio (NR) system, the reporting of a PHR is supported. In the related art, the PHR is usually triggered for state information of a local (serving) network node, and only a Power Headroom (PH) of the local network node is included in the PHR. However, in a mobile scenario or a multi-TRP scenario, the PH of the local network node is reported only based on the state information of the local network node, which is not conducive to network device scheduling and network optimization.

SUMMARY

An embodiment of the present disclosure provides a PHR reporting method, a PHR receiving method, a terminal, and a network device.

According to a first aspect, an embodiment of the present disclosure provides a PHR reporting method, applied to a terminal, the method including:

reporting a PHR in a case that a preset reporting trigger condition is satisfied, the PHR including a PH of a network node, the network node including a neighboring network node, or the network node including a local network node and a neighboring network node.

According to a second aspect, an embodiment of the present disclosure provides a PHR reporting method, applied to a terminal, the method including:

reporting a PHR in a case that a preset reporting trigger condition is satisfied, where the reporting trigger condition includes at least one of the following:

a neighboring network node is configured, activated, or updated;

a cell group is configured, activated, or updated, the cell group including a cell of the neighboring network node;

a dual active protocol stack DAPS is configured;

configuration information of the neighboring network node changes;

a cell quality of a target cell satisfies a preset condition, the target cell including the cell of the neighboring network node; or in M path losses associated with the neighboring network node, at least K path losses have a variation value that exceeds a first preset value within a first preset time period, M and K being positive integers, and K being less than or equal to M.

According to a third aspect, an embodiment of the present disclosure provides a PHR receiving method, applied to a network device, the method including:

receiving a PHR reported by a terminal in a case that a preset reporting trigger condition is satisfied, the PHR including a PH of a network node, the network node including a neighboring network node, or the network node including a local network node and a neighboring network node.

According to a fourth aspect, an embodiment of the present disclosure provides a terminal, including:

a first transmission module, configured to report a PHR in a case that a preset reporting trigger condition is satisfied, the PHR including a PH of a network node, the network node including a neighboring network node, or the network node including a local network node and a neighboring network node.

According to a fifth aspect, an embodiment of the present disclosure provides a terminal, including:

a second transmission module, configured to report a PHR in a case that a preset reporting trigger condition is satisfied;

where the reporting trigger condition includes at least one of the following:

a neighboring network node is configured, activated, or updated;

a cell group is configured, activated, or updated, the cell group including a cell of the neighboring network node;

a dual active protocol stack DAPS is configured;

configuration information of the neighboring network node changes;

a cell quality of a target cell satisfies a preset condition, the target cell including the cell of the neighboring network node; or in M path losses associated with the neighboring network node, at least K path losses have a variation value that exceeds a first preset value within a first preset time period, M and K being positive integers, and K being less than or equal to M.

According to a sixth aspect, an embodiment of the present disclosure provides a network device, including:

a receiving module, configured to receive a PHR reported by a terminal in a case that a preset reporting trigger condition is satisfied, the PHR including a PH of a network node, the network node including a neighboring network node, or the network node including a local network node and a neighboring network node.

According to a seventh aspect, an embodiment of the present disclosure provides a terminal, including: a memory, a processor, and a program stored on the memory and executable on the processor, the program, when executed by the processor, implementing the steps of the above PHR reporting method.

According to an eighth aspect, an embodiment of the present disclosure provides a network device, including: a memory, a processor, and a program stored on the memory and executable on the processor, the program, when executed by the processor, implementing the steps of the above PHR receiving method.

According to a ninth aspect, an embodiment of the present disclosure provides a computer-readable storage medium, storing a computer program, the computer program, when executed by a processor, implementing the steps of the above PHR reporting method, or the computer program, when executed by a processor, implementing the steps of the above PHR receiving method.

According to a tenth aspect, an embodiment of the present disclosure further provides a computer software product, stored in a non-volatile storage medium, the software product being configured to be executed by at least one processor to implement the steps of the above PHR reporting method, or the steps of the above PHR receiving method.

According to an eleventh aspect, an embodiment of the present disclosure further provides a terminal, configured to perform the above PHR reporting method.

According to a twelfth aspect, an embodiment of the present disclosure further provides a network device, configured to perform the above PHR receiving method.

In this embodiment, since the PH of the neighboring network node is reported, the power headroom situation of the neighboring network node can be reflected. For a mobile scenario or a multi-TRP scenario, it can be more conducive to the scheduling of network devices and network optimization, so as to improve the service experience of mobile users.

BRIEF DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a structural diagram of a network system applicable to an embodiment of the present disclosure;

FIG. 2 is a flowchart of a PHR reporting method according to an embodiment of the present disclosure;

FIG. 3 is a flowchart of another PHR reporting method according to an embodiment of the present disclosure;

FIG. 4 is a flowchart of a PHR receiving method according to an embodiment of the present disclosure;

DETAILED DESCRIPTION

Figure 5:
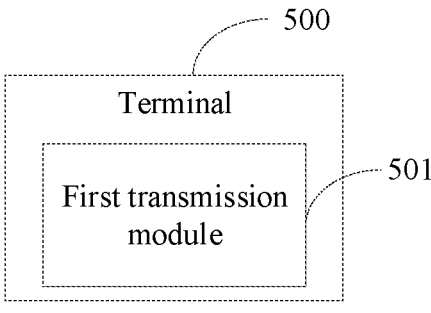
FIG. 5 is a structural diagram of a terminal according to an embodiment of the present disclosure.

The following describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification and claims of this application, the term "include" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, in the specification and claims, the use of "and/or" denotes at least one of connected objects, for example, A and/or B, which denotes three cases of including A alone, including B alone, and including A and B.

In the embodiments of the present disclosure, the term such as "exemplary" or "for example" is used to mean serving as an example, an illustration, or a description. Any embodiment or design scheme described as "exemplary" or "for example" in the embodiments of the present disclosure should not be construed as being preferred or superior to other embodiments or design schemes. The use of the term such as "exemplary" or "for example" is intended to present the related concepts in a specific manner.

The embodiments of the present disclosure are described below with reference to the accompanying drawings. A PHR reporting method, a PHR receiving method, a terminal, and a network device according to the embodiments of the present disclosure can be applied to a wireless communication system. The wireless communication system may be a 5th Generation (5G) system, an evolved Long Term Evolution (eLTE) system, or a subsequent evolution communication system.

Referring to FIG. 1, FIG. 1 is a structural diagram of a network system applicable to an embodiment of the present disclosure. As shown in FIG. 1, the network system includes a terminal 11 and a network device 12, The terminal 11 may be a user terminal or another terminal side device, for example, the terminal side device such as a mobile phone, a tablet personal computer, a laptop computer, a Personal Digital Assistant (PDA), a Mobile Internet Device (MID), or a wearable device. It should be noted that, the specific type of the terminal 11 is not limited in the embodiments of the present disclosure. The network device 12 may be a 5G base station, or a base station of a later version, or a base station in another communication system, or may be referred to as a Node B, an evolved Node B, a Transmission Reception Point (TRP), an Access Point (AP), or another term in the field as long as the same technical effect is achieved. The network device is not limited to a particular technical term. In addition, the network device 12 may be a Master Node (MN) or a Secondary Node (SN). It should be noted that in the embodiments of the present disclosure, only the 5G base station is used as an example, but the specific type of the network device is not limited.

Referring to FIG. 2, FIG. 2 is a flowchart of a power headroom report PHR reporting method according to an embodiment of the present disclosure, the method is applied to a terminal, and as shown in FIG. 2, the method includes the following steps.

Step 201: Report a PHR in a case that a preset reporting trigger condition is satisfied, the PHR including a PH of a network node, the network node including a neighboring network node, or the network node including a local network node and a neighboring network node.

In this embodiment, the reported PHR includes the power headroom PH of one or more network nodes. In other words, the above PHR includes the PHR of one or more network nodes, where the PHR of the network node may include the PH of the network node and a maximum transmit power $(P_{CMAX,f,c})$ supported by a carrier corresponding to the network node. In some embodiments, the reporting trigger condition may be configured by a network device or agreed in a protocol, which is not further limited herein.

The local network node includes a local TRP and/or a local cell; and the neighboring network node includes a neighboring TRP and/or a neighboring cell.

In this embodiment, since the PH of the neighboring network node is reported, the power headroom situation of the neighboring network node can be reflected. For a mobile scenario or a multi-TRP scenario, it can be more conducive to the scheduling of network devices and network optimization, so as to improve the service experience of mobile users.

It should be noted that, in another embodiment, in a case that the terminal can run to report the PHR of the neighboring network node, the terminal can determine whether to report the PHR of the neighboring network node, that is, the terminal can only report the PHR of the local network node.

In some embodiments, the reported neighboring network node may be indicated by the network device, or may be a neighboring network node that satisfies specific conditions by default in the protocol. In other words, the neighboring network node included in the PHR is any one of the following:

a neighboring network node indicated by high layer signaling;

a neighboring network node indicated by physical layer signaling; or a configured, activated, or updated neighboring network node.

In an embodiment, the terminal can learn about a to-be-reported neighboring network node through the content, configuration information, and the like of the high layer signaling. In some embodiments, the high layer signaling may be additionally newly added signaling, which may be at least one of high layer signaling such as a Medium Access Control Control Element (MAC CE) or Radio Resource Control (RRC).

In another embodiment, the terminal can learn about the to-be-reported neighboring network node through the content, configuration information, and the like of the physical layer signaling. In some embodiments, the physical layer signaling may be additionally newly added signaling, which may be signaling such as Downlink Control Information (DCI).

The configured, activated, or updated neighboring network node is indicated by at least one of the following signaling:

power control configuration signaling;

cell configuration signaling;

high layer measurement related signaling;

Channel State Information (CSI) related configuration signaling; or channel related configuration signaling.

For the power control configuration signaling, identification information of the neighboring network node may be indicated in Power Headroom Report Configuration (PHR-Config), Physical Uplink Control Channel-Power Control (PUCCH-PowerControl), Physical Uplink Shared Channel-Power Control (PUSCH-PowerControl) and associated signaling thereof. The associated signaling may be understood as first signaling including the PHR-Config, the, or the, and the first signaling includes the identification information of the neighboring network node. The associated signaling may also be understood as second signaling included in the PHR-Config, the PUCCH-PowerControl, or the PUSCH-PowerControl, and the second signaling includes the identification information of the neighboring network node. In the above description, signaling A includes signaling B, and also refers to multi-layer configuration, using two-layer configuration as an example, that is, the signaling A includes signaling C, and the signaling C further includes the signaling B; and using three-layer configuration as an example, that is, the signaling A includes the signaling C, the signaling C further includes signaling D, and the signaling D further includes the signaling B. The associated signaling described in the following embodiments can be deduced by analogy, and the description is not repeated.

For the cell configuration signaling, the identification information of the neighboring network node may be indicated in Cell Group Configuration (CellGroupConfig), Special primary Cell Configuration (SpCellConfig), Synchronization Reconfiguration (ReconfigurationWithSync), Serving Cell Common Configuration (ServingCellConfigCommon), Serving Cell Configuration (ServingCellConfig), and associated signaling thereof.

For the high layer measurement related signaling, the identification information of the neighboring network node may be indicated in Measurement Configuration (MeasConfig) and associated signaling thereof.

For the CSI related configuration signaling, the identification information of the neighboring network node may be indicated in CSI Measurement Configuration (CSI-MeasConfig), CSI Report Configuration (CSI-ReportConfig), CSI Resource Configuration (CSI-ResourceConfig), Non-Zero Power CSI Reference Signal Resource Set (NZP-CSI-RS-ResourceSet), Non-Zero Power CSI-RS Resource (NZP-CSI-RS-Resource), CSI Synchronization Signal and PBCH Block Resource Set (CSI-SSB-ResourceSet), Sounding Reference Signal Configuration (SRS-Config), Sounding Reference Signal Resource Set (SRS-ResourceSet), Sounding Reference Signal Resource (SRS-Resource), and associated signaling thereof.

For the channel related configuration signaling, the identification information of the neighboring network node may be indicated in Physical Downlink Control Channel-Config (PDCCH-Config), Physical Downlink Shared Channel-Config (PDSCH-Config), Physical Uplink Control Channel-Config (PUCCH-Config), Physical Uplink Shared Channel-Config (PUSCH-Config), Control Resource Set (CORESET), and associated signaling thereof.

In some embodiments, the PH of the network node includes a PH of an uplink of a target object in the network node, the target object includes a serving cell or a transmission reception point TRP, and the target object satisfies at least one of the following:

the target object is in an activated state; or the uplink configured for the target object is associated with any medium access control MAC entity.

In a case that the above two conditions are satisfied and the target object is a cell, the PH of the network node may be understood as the PH of the uplink of a target cell, the target cell is an activated serving cell, and the uplink of the serving cell is associated with any Media Access Control MAC entity (for each activated Serving Cell with configured uplink associated with any MAC entity).

It should be understood that the serving cell may include a Primary cell (Pcell) and a Secondary cell (Scell). In an embodiment, in a case that the target object is a serving cell, the target object further satisfies at least one of the following:

in a case that the terminal is in multiple PHR configuration, the serving cell includes the primary cell and the secondary cell;

and/or in a case that the terminal is in single PHR (Single Entry PHR format) configuration, the serving cell includes the primary cell.

In some embodiments, the terminal is in multiple PHR configuration, which may be understood as that multiplePHR signaling is configured to be true; and the terminal is in single PHR configuration, which may be understood as that the multiplePHR signaling is not configured to be true.

It should be understood that the TRP may include a primary TRP and a secondary TRP. The primary TRP may be a TRP specified by the network, or a TRP with an identification (ID) of 0, a TRP with the smallest ID, or a TRP with the largest ID, where the identification of the TRP is represented by a high layer parameter, for example, may be represented by CORESETPoolIndex.

Further, the above PH may satisfy any one of the following:

the PH is a difference between a maximum transmit power of the terminal and a transmit power of an uplink shared channel in a case that there is PUSCH transmission on the target object;

the PH is a difference between a maximum transmit power of the terminal and a transmit power of an SRS in a case that there is SRS transmission on the target object; and the PH is a virtual PH in a case that there is no PUSCH transmission and SRS transmission on the target object.

In this embodiment, the maximum transmit power of the terminal may be understood as a nominal UE maximum transmit power, the transmit power of the uplink shared channel may be understood as the estimated power for Uplink-Shared Channel (UL-SCH) transmission (the estimated power for UL-SCH transmission), and the transmit power of the SRS may be understood as the estimated power for SRS transmission. In other words, in a case that there is PUSCH transmission on the target object, the PH is a type 1 PH; and in a case that there is SRS transmission on the target object, the PH is a type 3 PH.

It should be noted that, in a case that there is the PUSCH transmission on the target object, when PUSCH repetition occurs, the PH is determined by at least one of the following:

PUSCH at a latest moment;

PUSCH at a farthest moment;

PUSCH at an intermediate moment;

an average of multiple PUSCHs;

PUSCH specified by the network; or specific PUSCH reported by the UE. It should be understood that the manner of reporting the PHR may be configured according to actual requirements, for example, in an embodiment, the above PHR satisfies any one of the following:

a PH of one network node is reported in one PHR;

PHs of different network nodes are reported sequentially in a same PHR; or one PHR includes a joint PH of N network nodes, N being an integer greater than 1.

It should be understood that in this embodiment, The PHs of different network nodes may be reported separately in different PHRs, or may be sequentially reported in one PHR, or a joint PH of multiple network nodes may be reported in one PHR.

In this embodiment, a joint PH of N network nodes is reported in one PHR, that is, a maximum value, a minimum value, an average value, or another type of weighted value among the PHs of the N network nodes. The another type of weighted value may be expressed as: arithmetic average, geometric average, harmonic average, square average, weighted average, minimum value maximization, maximum value minimization, and other combinations and simple variations.

It should be noted that, in a case of reporting the joint PH, a determination method of a federation $P_{CMAX,f,c}$ is a maximum value, a minimum value, an average value, or another type of weighted value among the $P_{CMAX,f,c}$ of the N network nodes. The another type of weighted value may be expressed as: arithmetic average, geometric average, harmonic average, square average, weighted average, minimum value maximization, maximum value minimization, and other combinations and simple variations. It should be understood that the determination method of the joint PH may be the same as or different from the determination method of the $P_{CMAX,f,c}$.

For example, in an embodiment, in a case that the PHR includes PHs and $P_{CMAX,f,c}$ of at least two network nodes, if a PH of one network node is reported in one PHR or PHs of different network nodes are reported sequentially in a same PHR, a PH and $P_{CMAX,f,c}$ of each network node are reported in a preset order, where the $P_{CMAX,f,c}$ is a maximum transmit power supported by a carrier.

In some embodiments, the PHR can carry the identification information of the network node or identification related information of the network node. The identification information of the network node includes: a transmission point identification TRP ID of the neighboring TRP; or a physical cell identification PCI or a cell identification cell ID of the neighboring cell. Correspondingly, the identification related information of the neighboring network node includes: TRP ID related information, or PCI related information or cell ID related information of the neighboring cell. In some embodiments, the TRP ID is represented by CORESETPoolIndex.

In some embodiments, in a case that PHs of different network nodes are reported sequentially in a same PHR, the reporting a PH and $P_{CMAX,f,c}$ of each network node in a preset order includes any one of the following:

reporting a PH and $P_{CMAX,f,c}$ of one network node in the preset order, and then reporting a PH and $P_{CMAX,f,c}$ of a next network node; or reporting a $P_{CMAX,f,c}$ of each network node in the preset order after reporting a PH of each network node in the preset order.

The preset order may be an order configured by the network device, or an order reported by the terminal.

In some embodiments, the preset order satisfies at least one of the following:

reporting of a local network node takes precedence over reporting of a neighboring network node, or reporting of a neighboring network node takes precedence over reporting of a local network node;

reporting of the primary cell takes precedence over reporting of the secondary cell in a case that one network node includes a primary cell and a secondary cell; or reporting of the primary TRP takes precedence over reporting of the secondary TRP in a case that one network node includes a primary TRP and a secondary TRP. The primary TRP may be a TRP specified by the network, or a TRP with an ID of 0, a TRP with the smallest ID, or a TRP with the largest ID, where the identification of the TRP is represented by CORESET-PoolIndex.

In the preset order, an order of the neighboring network node is determined according to at least one of the following:

identification information of the network node or related information of the identification information of the network node;

a value of the PH;

a value of the $P_{CMAX,f,c}$;

the quality of the uplink, for example, which may be represented by the following parameters: Layer 1 (L1)/ Layer 3 (L3)—Reference Signal Received Power (RSRP)/Signal-to-Noise and Interference Ratio (SINR)/Reference Signal Received Quality (RSRQ);

a value of the path loss, for example, which may be represented by the following parameters: L1/L3—RSRP/SINR/RSRQ;

a quality of the path loss reference signal, for example, can be represented by: L1/L3—RSRP/SINR/RSRQ;

a cell quality or a TRP quality, for example, which may be obtained by L3-filtered beam quality, and the beam quality can be represented by the following parameters: RSRP, SINR or RSRQ;

a physical distance between a neighboring cell and a local cell;

TRP identification related information, for example, the TRP is identified as CORESETPoolIndex; or a physical distance between TRPs.

It should be understood that the reporting trigger condition includes at least one of the following:

a neighboring network node is configured, activated, or updated;

a cell group is configured, activated, or updated, the cell group including a cell of the neighboring network node;

a Dual Active Protocol Stack (DAPS) is configured;

configuration information of the neighboring network node changes;

a cell quality of a target cell satisfies a preset condition, the target cell including the cell of the neighboring network node; or in M path losses associated with the neighboring network node, at least K path losses have a variation value that exceeds a first preset value within a first preset time period, M and K being positive integers, and K being less than or equal to M.

In this embodiment, the identification information of the configured, activated, or updated neighboring network node may be indicated by at least one of the following signaling:

power control configuration signaling;

cell configuration signaling;

high layer measurement related signaling;

Channel State Information (CSI) related configuration signaling; or channel related configuration signaling.

The following description describes the definition of M path losses, for example, in a case that the PHR includes PHs of L network nodes, the M path losses are any one of the following:

the first M path losses in path losses of the L network nodes ranked in descending order;

the first M path losses in path losses of the L network nodes ranked in ascending order;

path losses of the first M network nodes in the L network nodes ranked in ascending order according to identification information;

path losses of the first M network nodes in the L network nodes ranked in descending order according to the identification information;

path losses of network nodes in which the identification information is 0 in the L network nodes;

path losses of any M network nodes in the L network nodes;

path losses of M network nodes indicated by a network device in the L network nodes;

path losses of M network nodes reported by a terminal in the L network nodes;

path loss weighted values of all or part of the L network nodes;

a path loss of a first network node, the first network node being a network node in which the path loss changes at the most recent time in the L network nodes;

a path loss of a second network node, the second network node being a network node in which the path loss is updated at the most recent time in the L network nodes;

path losses of the L network nodes;

path losses of the first M network nodes in path losses of the L network nodes ranked in descending order according to a first variation value; or path losses of the first M network nodes in path losses of the L network nodes ranked in ascending order according to the first variation value.

L is an integer greater than 1 and L is greater than or equal to M, and the first variation value is a variation value of the path loss within a second preset period.

In this embodiment, the path loss is calculated based on a Path Loss Reference Signal (PL RS), and the PL RS is transmitted according to a specific period of time. The terminal can obtain a path loss estimation value through the transmitted PL RS at regular intervals. "Change" means that a path loss calculated and obtained by the PL RS changes. "Update" means that the PL RS reaches a transmission period and the terminal has obtained a new path loss estimation value, and the path loss estimation value may be the same as the previous path loss estimation value. The first preset time period may be understood as a time interval between two adjacent calculation of the path loss, a time interval between two adjacent reporting of the PHR, or a time interval between the current calculation of the path loss and the last reporting of the PHR. It may be that a variation value of a path loss exceeds the first preset value, or may be that a variation value of multiple path losses exceeds the first preset value.

The path loss weighted value may be understood as a maximum value, a minimum value, an average value, or another type of weighted value among the PHs of the multiple network nodes. The another type of weighted value may be expressed as: arithmetic average, geometric average, harmonic average, square average, weighted average, minimum value maximization, maximum value minimization, and other combinations and simple variations.

In some embodiments, that a cell quality of a target cell satisfies a preset condition includes at least one of the following:

a cell quality of the neighboring network node is lower than a second preset value;

a cell quality of the neighboring network node is higher than a third preset value;

a difference between a cell quality of the local network node and a cell quality of the neighboring network node is lower than a fourth preset value; or a difference between a cell quality of the local network node and a cell quality of the neighboring network node is higher than a fifth preset value.

It should be noted that in an embodiment, the transmission of the PHR is triggered only in a case that the cell quality of the target cell satisfies a preset condition for a specific period of time.

Further, that a cell quality of a target cell satisfies a preset condition further includes at least one of the following:

the cell quality of the local network node is lower than a sixth preset value; or the cell quality of the local network node is higher than a seventh preset value.

In some embodiments, the configuration information is control resource set configuration information in the configuration of a physical downlink control channel.

For example, in this embodiment, the configuration information may include at least one of the following: CORE-SETpoolindex, a Transmission Configuration Indicator (TCI), or a search space.

For a better understanding of the present disclosure, the specific implementations of the present disclosure are described in detail below.

The PHR is associated with the neighboring network node, that is, the reported PHR may not only include the PH of the local network node, but also include the PH of the neighboring network node.

I. Methods for PHR to be Associated with Neighboring Network Node:

Method 1: The network configures first high layer signaling.

In some embodiments, the UE may learn about the neighboring network node through the content, configuration information, and the like of the first high layer signaling.

In some embodiments, the first high layer signaling is additionally newly added signaling, and may be at least one of the first high layer signaling such as MAC CE, RRC, or the like. The first high layer signaling herein may also be replaced with physical layer signaling, and the physical layer signaling may be at least one of the signaling such as DCI or the like.

Method 2: The network configures, activates, or updates the identification information of the neighboring network node.

For example, in an embodiment, the power control configuration signaling, such as PHR-Config, PUCCH-Power-Control, PUSCH-PowerControl, and the associated signaling thereof may be used.

For example, in an embodiment, the cell configuration signaling, such as CellGroupConfig, SpCellConfig, ReconfigurationWithSync, Serving CellConfigCommon, ServingCellConfig and the associated signaling thereof, may be used.

For example, in an embodiment, the high layer measurement related signaling, such as MeasConfig and the associated signaling thereof, may be used.

For example, in an embodiment, the CSI related configuration signaling, such as CSI-MeasConfig, CSI-ReportConfig, CSI-ResourceConfig, NZP-CSI-RS-Resource Set, NZP-CSI-RS-Resource, CSI-SSB-ResourceSet, SRS-Config, SRS-ResourceSet, SRS-Resource, and the associated signaling thereof may be used.

For example, in an embodiment, the channel related configuration signaling, such as PDCCH-Config, PDSCH-Config, PUCCH-Config, PUSCH-Config, CORESET, and the associated signaling thereof may be used.

II. Format Design of PHR

A first PH of an uplink carrier of a first cell is calculated for the first network node. The first network node includes at least one of the following: a neighboring network node or a local network node. The neighboring network node may be understood as a neighboring network node associated with the PHR.

In some embodiments, the definition of the first cell is as follows: each activated serving cell with configured uplink associated with any MAC entity belongs to the first network node.

In some embodiments, under the Multiple PHR configuration, for example, the first cell includes a Pcell and a Scell in a case that the multiple PHR signaling is configured to be true.

In some embodiments, under the Single Entry PHR format configuration, for example, the first cell includes a Pcell the multiple PHR signaling is not configured to be true.

In some embodiments, the first PH is defined as follows:

1. Type 1 power headroom: a difference between the nominal UE maximum transmit power and the estimated power for UL-SCH transmission, for the local network node and/or the neighboring network node. In some embodiments, the type 1 power headroom may be used in a case that there is PUSCH transmission on the first cell.

2. Type 3 power headroom: a difference between the nominal UE maximum transmit power and the estimated power for SRS transmission, for the local network node and/or the neighboring network node. In some embodiments, the type 3 power headroom may be used in a case that there is SRS transmission on the first cell.

3. The virtual PH is reported in a case that there is no PUSCH or SRS transmission on the first cell.

In some embodiments, the PHs of different network nodes may be reported separately in different PHRs, or sequentially reported in one PHR, or a joint PH of multiple network nodes may be reported in one PHR.

In some embodiments, a joint PH of multiple network nodes is reported in one PHR, that is, a maximum value, a minimum value, an average value, or another type of weighted value among the PHs of the multiple network nodes. The another type of weighted values may be expressed as: arithmetic average, geometric average, harmonic average, square average, weighted average, minimum value maximization, maximum value minimization, and other combinations and simple variations.

In some embodiments, the PHR carries the identification information of the network node or the identification related information of the network node.

In some embodiments, the multiple PHs of the multiple network nodes are reported in order, and the order may be understood as an order of the multiple network nodes within a PHR, or an order of the multiple PHRs.

In some embodiments, the PH and $P_{CMAX,f,c}$ of each network node are reported in order, that is, in an embodiment, the PH and $P_{CMAX,f,c}$ of a network node are reported first, and then the PH and $P_{CMAX,f,c}$ of the next network node are reported. In another embodiment, the PH of each network node may be reported first in order, and then the $P_{CMAX,f,c}$ of each network node may be reported.

The above order satisfies at least one of the following:

A. An order of network configuration, or an order of UE reporting, for example, the network device can configure the order by the signaling such as RRC, MAC CE, and DCI.

B. The local network node has the highest or lowest priority.

C. The order of the neighboring network node is determined according to at least one of the following:

1. identification information of the network node or the identification related information of the network node;

2. a value of the PH;

3. a value of the $P_{CMAX,f,c}$;

4. a quality of the uplink;

5. a value of the path loss;

6. a quality of the PL RS;

7. a cell quality/TRP quality, for example, can be obtained by L3-filtered beam quality;

8. a physical distance between the neighboring cell and the local cell;

9. TRP ID related information, for example, the TRP ID is CORESETPoolIndex; or 10. a physical distance between the TRPs.

D. In a case that the first cell includes the Pcell and the Scell, the Pcell is reported first and then the Scell is reported inside a network node.

III. Trigger Conditions for PHR a neighboring network node is configured, activated, or updated;

a cell group is configured, activated, or updated, the cell group including a cell of the neighboring network node, where, for example, the cell group may be a secondary cell group;

a dual active protocol stack DAPS is configured, for example, it can be configured via dapsHO-Config or related signaling;

configuration information of the neighboring network node changes, for example, CORESET configuration information in the PDCCH-config changes, and for example, the changed CORESET configuration information may include at least one of the following: the CORESETpoolindex, the TCI, or the search space; and a cell quality of the local network node and/or the neighboring network node satisfies a target condition, for example, it can be obtained through RRM measurement and L3 filtering.

In some embodiments, the above target condition includes at least one of the following:

condition 1, the cell quality of the local network node is lower than a specific threshold;

condition 2, the cell quality of the local network node is higher than a specific threshold;

condition 3: the cell quality of the neighboring network node is lower than a specific threshold;

condition 4: the cell quality of the neighboring network node is higher than a specific threshold;

condition 5: a difference between the cell qualities of the local network node and the neighboring network node is lower than a specific threshold; or conditional 6, a difference between the cell qualities of the local network node and the neighboring network node is higher than a specific threshold.

For example, in an embodiment, the reporting of the PHR is triggered in a case that the above target condition is satisfied for a certain amount of time.

It should be noted that, in an embodiment of the present disclosure, various configuration may be determined through signaling configuration, protocol default, or terminal self-selection. The signaling such as RRC, MAC CE, DCI, or the like may be used.

In some embodiments, the protocol may default to one of the modes; the network may configure one of the modes; or the terminal itself may select one of the modes, where the mode may be understood as a determination method of various configuration.

Referring to FIG. 3, FIG. 3 is a flowchart of another power headroom report PHR reporting method according to an embodiment of the present disclosure, the power headroom report PHR reporting method is applied to a terminal, and as shown in FIG. 3, the method includes the following steps.

Step 301: Report a PHR in a case that a preset reporting trigger condition is satisfied.

The reporting trigger condition includes at least one of the following:

a neighboring network node is configured, activated, or updated;

a cell group is configured, activated, or updated, the cell group including a cell of the neighboring network node;

a dual active protocol stack DAPS is configured;

configuration information of the neighboring network node changes;

a cell quality of a target cell satisfies a preset condition, the target cell including the cell of the neighboring network node; or in M path losses associated with the neighboring network node, at least K path losses have a variation value that exceeds a first preset value within a first preset time period, M and K being positive integers, and K being less than or equal to M.

In this embodiment, since the reporting trigger condition associated with the neighboring network node is set, the PHR report is triggered, so that the state information of the neighboring network node can be indirectly reflected. For the mobile scenario or the multi-TRP scenario, it can be more conducive to the scheduling of network devices and network optimization, so as to improve the service experience of mobile users.

In some embodiments, the PHR includes a PH of the network node, and the network node includes the local network node and/or the neighboring network node.

In some embodiments, in a case that the PHR includes PHs of L network nodes, the M path losses are any one of the following:

the first M path losses in path losses of the L network nodes ranked in descending order;

the first M path losses in path losses of the L network nodes ranked in ascending order;

path losses of the first M network nodes in the L network nodes ranked in ascending order according to identification information;

path losses of the first M network nodes in the L network nodes ranked in descending order according to the identification information;

path losses of network nodes in which the identification information is 0 in the L network nodes;

path losses of any M network nodes in the L network nodes;

path losses of M network nodes indicated by a network device in the L network nodes;

path losses of M network nodes reported by a terminal in the L network nodes;

path loss weighted values of all or part of the L network nodes;

a path loss of a first network node, the first network node being a network node in which the path loss changes at the most recent time in the L network nodes;

a path loss of a second network node, the second network node being a network node in which the path loss is updated at the most recent time in the L network nodes;

path losses of the L network nodes;

path losses of the first M network nodes in path losses of the L network nodes ranked in descending order according to a first variation value; or path losses of the first M network nodes in path losses of the L network nodes ranked in ascending order according to the first variation value.

L is an integer greater than 1 and L is greater than or equal to M, and the first variation value is a variation value of the path loss within a second preset period.

In some embodiments, that a cell quality of a target cell satisfies a preset condition includes at least one of the following:

a cell quality of the neighboring network node is lower than a second preset value;

a cell quality of the neighboring network node is higher than a third preset value;

a difference between a cell quality of the local network node and a cell quality of the neighboring network node is lower than a fourth preset value; or a difference between a cell quality of the local network node and a cell quality of the neighboring network node is higher than a fifth preset value.

In some embodiments, that a cell quality of a target cell satisfies a preset condition further includes at least one of the following:

the cell quality of the local network node is lower than a sixth preset value; or the cell quality of the local network node is higher than a seventh preset value.

In some embodiments, the configuration information is control resource set configuration information in the configuration of a physical downlink control channel.

In this embodiment of the present disclosure, the implementation of each step can refer to the above embodiments, and the description is not repeated here.

Referring to FIG. 4, FIG. 4 is a flowchart of a PHR receiving method according to an embodiment of the present disclosure, the method is applied to a network device, and as shown in FIG. 4, the method includes the following steps.

Step 401: Receive a PHR reported by a terminal in a case that a preset reporting trigger condition is satisfied, the PHR including a PH of a network node, the network node including a neighboring network node, or the network node including a local network node and a neighboring network node.

In some embodiments, the neighboring network node included in the PHR is any one of the following:

a neighboring network node indicated by high layer signaling;

a neighboring network node indicated by physical layer signaling; or a configured, activated, or updated neighboring network node.

In some embodiments, the configured, activated, or updated neighboring network node is indicated by at least one of the following signaling:

power control configuration signaling;

cell configuration signaling;

high layer measurement related signaling;

channel state information CSI related configuration signaling; or channel related configuration signaling.

In some embodiments, the PH of the network node includes a PH of an uplink of a target object in the network node, the target object includes a serving cell or a transmission reception point TRP, and the target object satisfies at least one of the following:

the target object is in an activated state; or the uplink configured for the target object is associated with any medium access control MAC entity.

In some embodiments, the serving cell includes a primary cell and a secondary cell in a case that the terminal is in multiple PHR configuration;

and/or the serving cell includes a primary cell in a case that the terminal is in single PHR configuration.

In some embodiments, the PH satisfies any one of the following:

the PH is a difference between a maximum transmit power of the terminal and a transmit power of an uplink shared channel in a case that there is physical uplink shared channel PUSCH transmission on the target object;

the PH is a difference between a maximum transmit power of the terminal and a transmit power of an SRS in a case that there is sounding reference signal SRS transmission on the target object; or the PH is a virtual PH in a case that there is no PUSCH transmission and SRS transmission on the target object.

In some embodiments, the PHR satisfies any one of the following:

a PH of one network node is reported in one PHR;

PHs of different network nodes are reported sequentially in a same PHR; or one PHR includes a joint PH of N network nodes, N being an integer greater than 1.

In some embodiments, in a case that the PHR includes PHs and $P_{CMAX,f,c}$ of at least two network nodes, if a PH of one network node is reported in one PHR or PHs of different network nodes are reported sequentially in a same PHR, a PH and $P_{CMAX,f,c}$ of each network node are reported in a preset order, where the $P_{CMAX,f,c}$ is a maximum transmit power supported by a carrier.

In some embodiments, in a case that PHs of different network nodes are reported sequentially in a same PHR, the reporting a PH and $P_{CMAX,f,c}$ of each network node in a preset order includes any one of the following:

reporting a PH and $P_{CMAX,f,c}$ of one network node in the preset order, and then reporting a PH and $P_{CMAX,f,c}$ of a next network node; or reporting a $P_{CMAX,f,c}$ of each network node in the preset order after reporting a PH of each network node in the preset order.

In some embodiments, the preset order satisfies at least one of the following:

reporting of a local network node takes precedence over reporting of a neighboring network node, or reporting of a neighboring network node takes precedence over reporting of a local network node; or reporting of the primary cell takes precedence over reporting of the secondary cell in a case that a network node includes a primary cell and a secondary cell.

In some embodiments, in the preset order, an order of the neighboring network node is determined according to at least one of the following:

identification information of the network node or related information of the identification information of the network node;

a value of the PH;

a value of the $P_{CMAX,f,c}$;

a quality of an uplink;

a value of a path loss;

a quality of a path loss reference signal;

a cell quality or a TRP quality;

a physical distance between a neighboring cell and a local cell;

TRP identification related information; or a physical distance between TRPs.

It should be noted that this embodiment is used as an implementation of the network device corresponding to the embodiment shown in FIG. 2, the implementation of this embodiment can refer to the related descriptions of the embodiment shown in FIG. 2, and the same effects can be achieved. The description is not repeated herein in order to avoid repetition.

Referring to FIG. 5, FIG. 5 is a structural diagram of a terminal according to an embodiment of the present disclosure. As shown in FIG. 5, a terminal 500 includes:

a first transmission module 501, configured to report a PHR in a case that a preset reporting trigger condition is satisfied, the PHR including a PH of a network node, the network node including a neighboring network node, or the network node including a local network node and a neighboring network node.

In some embodiments, the neighboring network node included in the PHR is any one of the following:

a neighboring network node indicated by high layer signaling;

a neighboring network node indicated by physical layer signaling; or a configured, activated, or updated neighboring network node.

In some embodiments, the configured, activated, or updated neighboring network node is indicated by at least one of the following signaling:

power control configuration signaling;

cell configuration signaling;

high layer measurement related signaling;

channel state information CSI related configuration signaling; or channel related configuration signaling.

In some embodiments, the PH of the network node includes a PH of an uplink of a target object in the network node, the target object includes a serving cell or a transmission reception point TRP, and the target object satisfies at least one of the following:

the target object is in an activated state; or the uplink configured for the target object is associated with any medium access control MAC entity.

In some embodiments, the serving cell includes a primary cell and a secondary cell in a case that the terminal is in multiple PHR configuration;

and/or the serving cell includes a primary cell in a case that the terminal is in single PHR configuration.

In some embodiments, the PH satisfies any one of the following:

the PH is a difference between a maximum transmit power of the terminal and a transmit power of an uplink shared channel in a case that there is physical uplink shared channel PUSCH transmission on the target object;

the PH is a difference between a maximum transmit power of the terminal and a transmit power of an SRS in a case that there is sounding reference signal SRS transmission on the target object; or the PH is a virtual PH in a case that there is no PUSCH transmission and SRS transmission on the target object.

In some embodiments, the PHR satisfies any one of the following:

a PH of one network node is reported in one PHR;

PHs of different network nodes are reported sequentially in a same PHR; or one PHR includes a joint PH of N network nodes, N being an integer greater than 1.

In some embodiments, in a case that the PHR includes PHs and $P_{CMAX,f,c}$ of at least two network nodes, if a PH of one network node is reported in one PHR or PHs of different network nodes are reported sequentially in a same PHR, a PH and $P_{CMAX,f,c}$ of each network node are reported in a preset order, where the $P_{CMAX,f,c}$ is a maximum transmit power supported by a carrier.

In some embodiments, in a case that PHs of different network nodes are reported sequentially in a same PHR, the reporting a PH and $P_{CMAX,f,c}$ of each network node in a preset order includes any one of the following:

reporting a PH and $P_{CMAX,f,c}$ of one network node in the preset order, and then reporting a PH and $P_{CMAX,f,c}$ of a next network node; or reporting a $P_{CMAX,f,c}$ of each network node in the preset order after reporting a PH of each network node in the preset order.

In some embodiments, the preset order satisfies at least one of the following:

reporting of a local network node takes precedence over reporting of a neighboring network node, or reporting of a neighboring network node takes precedence over reporting of a local network node; or reporting of the primary cell takes precedence over reporting of the secondary cell in a case that a network node includes a primary cell and a secondary cell.

In some embodiments, in the preset order, an order of the neighboring network node is determined according to at least one of the following:

identification information of the network node or related information of the identification information of the network node;

a value of the PH;

a value of the $P_{CMAX,f,c}$;

a quality of an uplink;

a value of a path loss;

a quality of a path loss reference signal;

a cell quality or a TRP quality;

a physical distance between a neighboring cell and a local cell;

TRP identification related information; or a physical distance between TRPs.

The terminal according to this embodiment of the present disclosure can implement the various processes implemented by the terminal in the embodiment of the method in FIG. 2, and the description is not repeated herein in order to avoid repetition.

Figure 6:
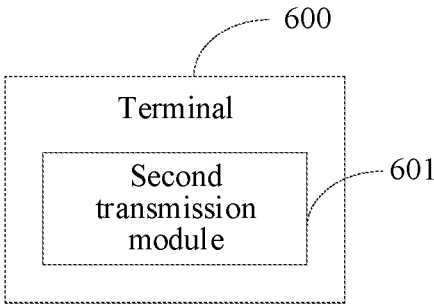
FIG. 6 is a structural diagram of another terminal according to an embodiment of the present disclosure.

Referring to FIG. 6, FIG. 6 is a structural diagram of a terminal according to an embodiment of the present disclosure. As shown in FIG. 6, a terminal 600 includes:

a second transmission module 601, configured to report a PHR in a case that a preset reporting trigger condition is satisfied.

The reporting trigger condition includes at least one of the following:

a neighboring network node is configured, activated, or updated;

a cell group is configured, activated, or updated, the cell group including a cell of the neighboring network node;

a dual active protocol stack DAPS is configured;

configuration information of the neighboring network node changes;

a cell quality of a target cell satisfies a preset condition, the target cell including the cell of the neighboring network node; or in M path losses associated with the neighboring network node, at least K path losses have a variation value that exceeds a first preset value within a first preset time period, M and K being positive integers, and K being less than or equal to M.

In some embodiments, the PHR includes a PH of a network node, and the network node includes a local network node and/or a neighboring network node.

In some embodiments, in a case that the PHR includes PHs of L network nodes, the M path losses are any one of the following:

the first M path losses in path losses of the L network nodes ranked in descending order;

the first M path losses in path losses of the L network nodes ranked in ascending order;

path losses of the first M network nodes in the L network nodes ranked in ascending order according to identification information;

path losses of the first M network nodes in the L network nodes ranked in descending order according to the identification information;

path losses of network nodes in which the identification information is 0 in the L network nodes;

path losses of any M network nodes in the L network nodes;

path losses of M network nodes indicated by a network device in the L network nodes;

path losses of M network nodes reported by a terminal in the L network nodes;

path loss weighted values of all or part of the L network nodes;

a path loss of a first network node, the first network node being a network node in which the path loss changes at the most recent time in the L network nodes;

a path loss of a second network node, the second network node being a network node in which the path loss is updated at the most recent time in the L network nodes;

path losses of the L network nodes;

path losses of the first M network nodes in path losses of the L network nodes ranked in descending order according to a first variation value; or path losses of the first M network nodes in path losses of the L network nodes ranked in ascending order according to the first variation value.

L is an integer greater than 1 and L is greater than or equal to M, and the first variation value is a variation value of the path loss within a second preset period.

In some embodiments, that a cell quality of a target cell satisfies a preset condition includes at least one of the following:

a cell quality of the neighboring network node is lower than a second preset value;

a cell quality of the neighboring network node is higher than a third preset value;

a difference between a cell quality of the local network node and a cell quality of the neighboring network node is lower than a fourth preset value; or a difference between a cell quality of the local network node and a cell quality of the neighboring network node is higher than a fifth preset value.

In some embodiments, that a cell quality of a target cell satisfies a preset condition further includes at least one of the following:

the cell quality of the local network node is lower than a sixth preset value; or the cell quality of the local network node is higher than a seventh preset value.

In some embodiments, the configuration information is control resource set configuration information in the configuration of a physical downlink control channel.

The terminal according to this embodiment of the present disclosure can implement the various processes implemented by the terminal in the embodiment of the method in FIG. 3, and the description is not repeated herein in order to avoid repetition.

Figure 7:
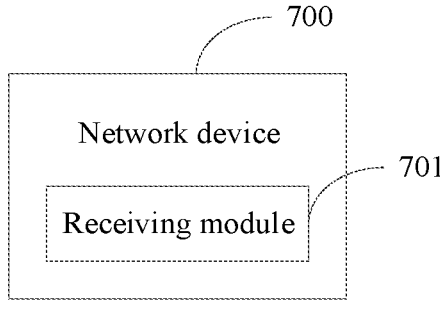
FIG. 7 is a structural diagram of a network device according to an embodiment of the present disclosure.

Referring to FIG. 7, FIG. 7 is a structural diagram of a network device according to an embodiment of the present disclosure. As shown in FIG. 7, a network device 700 includes:

a receiving module 701, configured to receive a PHR reported by a terminal in a case that a preset reporting trigger condition is satisfied, the PHR including a PH of a network node, the network node including a neighboring network node, or the network node including a local network node and a neighboring network node.

In some embodiments, the neighboring network node included in the PHR is any one of the following:

a neighboring network node indicated by high layer signaling;

a neighboring network node indicated by physical layer signaling; or a configured, activated, or updated neighboring network node.

In some embodiments, the configured, activated, or updated neighboring network node is indicated by at least one of the following signaling:

power control configuration signaling;

cell configuration signaling;

high layer measurement related signaling;

channel state information CSI related configuration signaling; or channel related configuration signaling.

In some embodiments, the PH of the network node includes a PH of an uplink of a target object in the network node, the target object includes a serving cell or a transmission reception point TRP, and the target object satisfies at least one of the following:

the target object is in an activated state; or the uplink configured for the target object is associated with any medium access control MAC entity.

In some embodiments, the serving cell includes a primary cell and a secondary cell in a case that the terminal is in multiple PHR configuration;

and/or the serving cell includes a primary cell in a case that the terminal is in single PHR configuration.

In some embodiments, the PH satisfies any one of the following:

the PH is a difference between a maximum transmit power of the terminal and a transmit power of an uplink shared channel in a case that there is physical uplink shared channel PUSCH transmission on the target object;

the PH is a difference between a maximum transmit power of the terminal and a transmit power of an SRS in a case that there is sounding reference signal SRS transmission on the target object; or the PH is a virtual PH in a case that there is no PUSCH transmission and SRS transmission on the target object.

In some embodiments, the PHR satisfies any one of the following:

a PH of one network node is reported in one PHR;

PHs of different network nodes are reported sequentially in a same PHR; or one PHR includes a joint PH of N network nodes, N being an integer greater than 1.

In some embodiments, in a case that the PHR includes PHs and $P_{CMAX,f,c}$ of at least two network nodes, if a PH of one network node is reported in one PHR or PHs of different network nodes are reported sequentially in a same PHR, a PH and $P_{CMAX,f,c}$ of each network node are reported in a preset order, where the $P_{CMAX,f,c}$ is a maximum transmit power supported by a carrier.

In some embodiments, in a case that PHs of different network nodes are reported sequentially in a same PHR, the reporting a PH and $P_{CMAX,f,c}$ of each network node in a preset order includes any one of the following:

reporting a PH and $P_{CMAX,f,c}$ of one network node in the preset order, and then reporting a PH and $P_{CMAX,f,c}$ of a next network node; or reporting a $P_{CMAX,f,c}$ of each network node in the preset order after reporting a PH of each network node in the preset order.

In some embodiments, the preset order satisfies at least one of the following:

reporting of a local network node takes precedence over reporting of a neighboring network node, or reporting of a neighboring network node takes precedence over reporting of a local network node; or reporting of the primary cell takes precedence over reporting of the secondary cell in a case that a network node includes a primary cell and a secondary cell.

In some embodiments, in the preset order, an order of the neighboring network node is determined according to at least one of the following:

identification information of the network node or related information of the identification information of the network node;

a value of the PH;

a value of the $P_{CMAX,f,c}$;

a quality of an uplink;

a value of a path loss;

a quality of a path loss reference signal;

a cell quality or a TRP quality;

a physical distance between a neighboring cell and a local cell;

TRP identification related information; or a physical distance between TRPs.

The network device according to this embodiment of the present disclosure can implement the various processes implemented by the network device in the embodiment of the method in FIG. 4, and the description is not repeated herein in order to avoid repetition.

Figure 8:
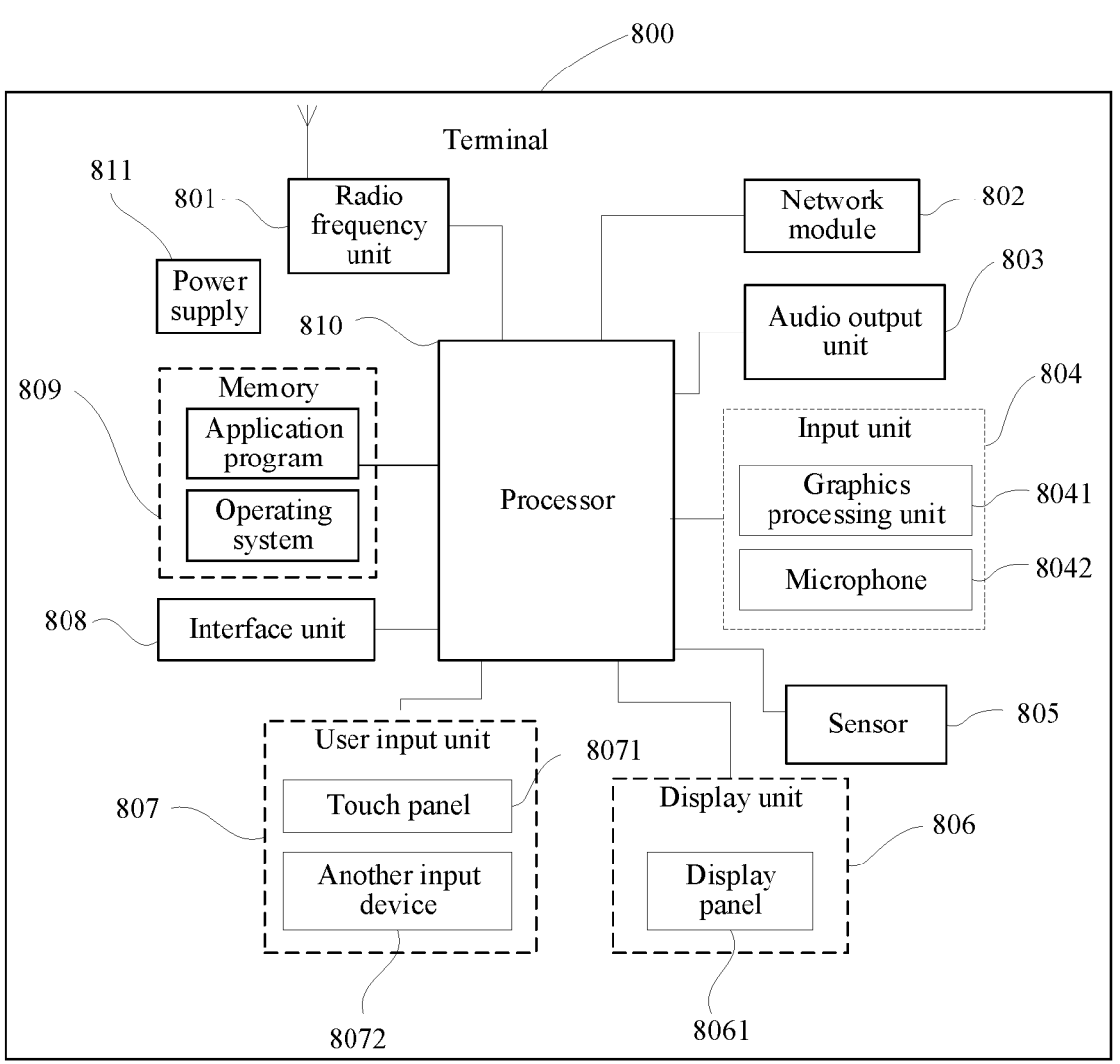
FIG. 8 is a structural diagram of another terminal according to an embodiment of the present disclosure.

FIG. 8 is a schematic structural diagram of hardware of a terminal implementing various embodiments of the present disclosure.

A terminal 800 includes, but is not limited to, components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute a limitation to the terminal, and the terminal may include more or fewer components than those shown in the figure, or some components may be combined, or a different component deployment may be used. In the embodiments of the present disclosure, the terminal includes, but is not limited to, a mobile phone, a tablet computer, a laptop computer, a handheld computer, an in-vehicle terminal, a wearable device, a pedometer, and the like.

A radio frequency unit 801 is configured to report a PHR in a case that a preset reporting trigger condition is satisfied, the PHR including a PH of a network node, the network node including a neighboring network node, or the network node including a local network node and a neighboring network node.

In some embodiments, the radio frequency unit 801 is configured to report a PHR in a case that a preset reporting trigger condition is satisfied.

The reporting trigger condition includes at least one of the following:

a neighboring network node is configured, activated, or updated;

a cell group is configured, activated, or updated, the cell group including a cell of the neighboring network node;

a dual active protocol stack DAPS is configured;

configuration information of the neighboring network node changes;

a cell quality of a target cell satisfies a preset condition, the target cell including the cell of the neighboring network node; or in M path losses associated with the neighboring network node, at least K path losses have a variation value that exceeds a first preset value within a first preset time period, M and K being positive integers, and K being less than or equal to M.

It should be understood that in this embodiment, the processor 810 and the radio frequency unit 801 can implement various processes implemented by the terminal in the embodiment of the method in FIG. 2 and FIG. 3, and the description is not repeated herein in order to avoid repetition.

It should be understood that in this embodiment of the present disclosure, the radio frequency unit 801 may be configured to receive and transmit signals in a process of receiving and transmitting information or calls to receive downlink data from a base station, and then transmit the downlink data to the processor 810 for processing; and transmit uplink data to the base station. Generally, the radio frequency unit 801 includes, but is not limited to, an antenna, at least one amplifier, a transceiver, a coupler, a low noise amplifier, a duplexer, or the like. In addition, the radio frequency unit 801 may further communicate with another device through a wireless communication system and a network.

The terminal provides wireless broadband Internet access to the user through the network module 802, for example, helps the user to send and receive emails, browse web pages, and access streaming media.

The audio output unit 803 may convert audio data received by the radio frequency unit 801 or the network module 802 or audio data stored in the memory 809 into audio signals and output the audio signals as sounds. Moreover, the audio output unit 803 may further provide an audio output related to a specific function executed by the terminal 800 (for example, a call signal reception sound, and a message reception sound). The audio output unit 803 includes a speaker, a buzzer, a receiver, and the like.

The input unit 804 is configured to receive audio or video signals. The input unit 804 may include a Graphics Processing Unit (GPU) 8041 and a microphone 8042. The graphics processing unit 8041 processes image data of static pictures or videos obtained by an image capture device (for example, a camera) in a video capture mode or an image capture mode. The processed image frames may be displayed on the display unit 806. The image frames processed by the graphics processing unit 8041 may be stored in the memory 809 (or another storage medium) or transmitted via the radio frequency unit 801 or the network module 802. The microphone 8042 may receive sounds and can process such sounds as audio data. The processed audio data may be converted, in a phone talk mode, into a format that may be transmitted to a mobile communication base station via the radio frequency unit 801 for output.

The terminal 800 further includes at least one sensor 805, such as an optical sensor, a motion sensor, and other sensors. The optical sensor includes an ambient light sensor and a proximity sensor. The ambient light sensor may adjust luminance of the display panel 8061 according to brightness of the ambient light. The proximity sensor may switch off the display panel 8061 and/or backlight when the terminal 800 is moved to the ear. As one type of motion sensor, an accelerometer sensor may detect magnitude of accelerations in various directions (generally, on three axes), may detect magnitude and a direction of gravity when static, and may be configured to recognize the attitude of the terminal (for example, switching between landscape orientation and portrait orientation, a related game, and magnetometer attitude calibration), a function related to vibration recognition (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein again.

The display unit 806 is configured to display information input by the user or information provided to the user. The display unit 806 may include a display panel 8061, and the display panel 8061 may be configured in the form of a Liquid Crystal Display (LCD), an Organic Light-Emitting Diode (OLED), or the like.

The user input unit 807 may be configured to receive input digit or character information, and generate a keyboard signal input related to the user setting and function control of the terminal. The user input unit 807 includes a touch panel 8071 and another input device 8072. The touch panel 8071, also referred to as a touchscreen, may collect a touch operation performed by a user on or near the touch panel (such as an operation performed by a user on or near the touch panel 8071 by using any suitable object or attachment, such as a finger or a touch pen). The touch panel 8071 may include two parts: a touch detection device and a touch controller. The touch detection device detects a touch orientation of the user, detects a signal brought by the touch operation, and transmits the signal to the touch controller. The touch controller receives touch information from the touch detection device, converts the touch information into contact coordinates, then transmits the contact coordinates to the processor 810, and receives and executes a command transmitted by the processor 810. In addition, the touch panel 8071 may be implemented by using various types, such as a resistive type, a capacitive type, an infrared type, and a surface acoustic wave type. In addition to the touch panel 8071, the user input unit 807 may further include the another input device 8072. The another input device 8072 may include, but is not limited to, a physical keyboard, a functional key (such as a volume control key or a switch key), a track ball, a mouse, and a joystick, and details are not described herein again.

Further, the touch panel 8071 may cover the display panel 8061. After detecting a touch operation on or near the touch panel 8071, the touch panel 8071 transfers the touch operation to the processor 810, so as to determine a type of the touch event. Then, the processor 810 provides corresponding visual output on the display panel 8061 according to the type of the touch event. Although in FIG. 8, the touch panel 8071 and the display panel 8061 are used as two separate parts to implement input and output functions of the terminal, in some embodiments, the touch panel 8071 and the display panel 8061 may be integrated to implement the input and output functions of the terminal, and details are not described herein again.

The interface unit 808 is an interface for connection between an external device and the terminal 800. For example, the external device may include a wired or wireless headphone port, an external power (or a battery charger) port, a wired or wireless data port, a memory card port, a port for connecting devices with an identification module, an audio input/output (Input/Output, I/O) port, a video I/O port, a headphone port, and the like. The interface unit 808 may be configured to receive input from the external device (for example, data information and power) and transmit the received input to one or more elements in the terminal 800, or may be configured to transmit data between the terminal 800 and the external device.

The memory 809 may be configured to store software programs and various pieces of data. The memory 809 may mainly include a program storage region and a data storage region. The program storage region may store an operating system, an application program required by at least one function (for example, a sound playback function and an image playback function), or the like. The data storage region may store data (for example, audio data and a phone book) created according to use of the mobile phone. In addition, the memory 809 may include a high speed random access memory, and may further include a non-volatile memory, such as at least one magnetic disk storage device, a flash memory device or other non-volatile solid state storage devices.

The processor 810 is a control center of the terminal, and connects to various parts of the terminal by using various interfaces and lines. By running or executing the software program and/or module stored in the memory 809, and invoking data stored in the memory 809, the processor performs various functions and data processing of the terminal, thereby performing overall monitoring on the terminal. The processor 810 may include one or more processing units. For example, the processor 810 may integrate an application processor and a modem processor. The application processor mainly processes an operating system, a user interface, an application program, and the like. The modem processor mainly processes wireless communication. It may be understood that the modem processor may either not be integrated into the processor 810.

The terminal 800 may further include the power supply 811 (such as a battery) for supplying power to the components. In some embodiments, the power supply 811 may be logically connected to the processor 810 by using a power management system, thereby implementing functions such as charging, discharging, and power consumption management by using the power management system.

In addition, the terminal 800 includes a number of functional modules that are not shown, and details are not described herein again.

For example, an embodiment of the present disclosure further provides a terminal, including a processor 810, a memory 809, and a computer program stored on the memory 809 and executable by the processor 810. The computer program, when executed by the processor 810, implements various processes of the embodiments of the PHR reporting method, and the same technical effect can be achieved. In order to avoid repetition, details are not described herein again.

Figure 9:
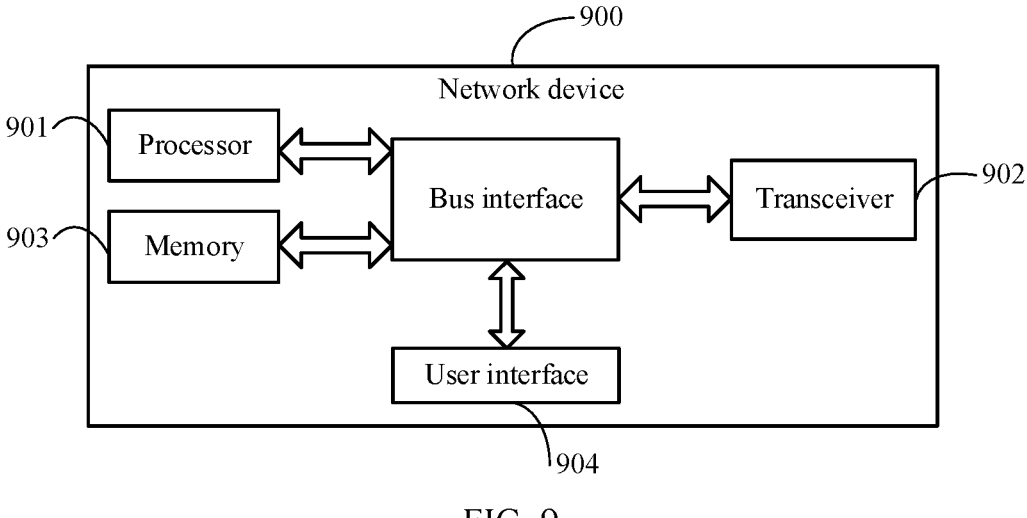
FIG. 9 is a structural diagram of another network device according to an embodiment of the present disclosure.

Referring to FIG. 9, FIG. 9 is a structural diagram of another network device according to an embodiment of the present disclosure. As shown in FIG. 9, a network device 900 includes a processor 901, a transceiver 902, a memory 903, and a bus interface.

The transceiver 902 is configured to receive a PHR reported by a terminal in a case that a preset reporting trigger condition is satisfied, the PHR including a PH of a network node, the network node including a neighboring network node, or the network node including a local network node and a neighboring network node.

It should be understood that in this embodiment, the processor 901 and the transceiver 902 can implement various processes implemented by the network device in the embodiment of the method in FIG. 4, and the description is not repeated herein in order to avoid repetition.

In FIG. 9, a bus architecture may include any quantity of interconnected buses and bridges, which are connected through one or more processors represented by the processor 901 and various circuits of memories represented by the memory 903. The bus architecture may further connect various other circuits such as a peripheral device, a voltage stabilizer, and a power management circuit. These are known in the art, and therefore are not further described in this specification. The bus interface provides an interface. The transceiver 902 may be multiple elements, that is, including a transmitter and a receiver, providing a unit configured to communicate with various other devices on a transmission medium. For different user devices, a user interface 904 may further be an interface capable of externally connecting devices required for internal connection, and the connected devices include, but are not limited to, a keypad, a display, a speaker, a microphone, a joystick, and the like.

The processor 901 is responsible for management of the bus architecture and general processing, and the memory 903 may store data used when the processor 901 performs an operation.

For example, an embodiment of the present disclosure further provides a network device, including the processor 901, the memory 903, and a computer program stored on the memory 903 and executable by the processor 901. The computer program, when executed by the processor 901, implements various processes of this embodiment of the PHR receiving method, and the same technical effect can be achieved. In order to avoid repetition, details are not described herein again.

An embodiment of the present disclosure further provides a computer-readable storage medium, storing a computer program. When executed by a processor, the computer program implements various processes of an embodiment of a PHR receiving method on a network device side according to this embodiment of the present disclosure, or when executed by a processor, the computer program implements various processes of an embodiment of a PHR reporting method on a terminal side according to this embodiment of the present disclosure, and the same technical effect can be achieved. In order to avoid repetition, details are not described herein again. The computer-readable storage medium is, for example, a Read-Only Memory (ROM), a Random Access Memory (RAM), a magnetic disk, or an optical disc.

It should be noted that, in this specification, the term "include", "comprise", or any other variant is intended to cover a non-exclusive inclusion, so that a process, a method, an article, or a device including a series of elements not only includes those elements, but also includes other elements that are not listed explicitly, or may further include elements inherent in the process, the method, the article, or the device.

Without more limitations, elements defined by the sentence "including one" does not exclude that there are still other same elements in the process, the method, the article, or the device.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for specific working processes of the foregoing described system, device and unit, refer to the corresponding processes in the foregoing method embodiments, and details are not described herein.

In the embodiments provided in this application, it should be understood that the disclosed device and method may be implemented in other manners. For example, the described device embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to implement the objectives of the solutions of the embodiments.

In addition, functional units in the embodiments of the present disclosure may be integrated into one processing unit, or each of the units may be physically separated, or two or more units may be integrated into one unit.

According to the description of the above implementations, a person skilled in the art may clearly understand that the method according to the embodiments may be implemented by means of software and a necessary general hardware platform, and may also be implemented by hardware, but in many cases, the former manner is a better implementation. Based on such an understanding, the technical solutions of the present disclosure essentially, or the part contributing to the related art, may be presented in the form of a software product. The computer software product is stored in a storage medium (for example, a ROM/RAM, a magnetic disk, or an optical disc), and contains several instructions to enable a terminal (which may be a mobile phone, a computer, a server, an air conditioner, a base station, or the like) to perform the methods according to the embodiments of the present disclosure.

A person of ordinary skill in the art may understand that all or some of the processes of the methods in the embodiments may be implemented by a computer program controlling related hardware. The program may be stored in a computer-readable storage medium. When the program is executed, the procedures of the foregoing method embodiments are performed. The storage medium may be a magnetic disc, an optical disk, a ROM, a RAM, or the like.

It may be understood that these embodiments described in the embodiments of the present disclosure may be implemented by hardware, software, firmware, middleware, microcode, or a combination thereof. For hardware implementation, modules, units, and sub-units may be implemented in one or more Application Specific Integrated Circuits (ASIC), Digital Signal Processors (DSP), DSP Devices (DSPDs), Programmable Logic Devices (PLDs), Field-Programmable Gate Arrays (FPGAs), general purpose processors, controllers, microcontrollers, microprocessors, other electronic units for performing the functions described in the present disclosure, or combinations thereof.

For software implementation, the techniques described in the embodiments of the present disclosure may be implemented by using modules (for example, processes, functions, and the like) of the functions described in the embodiments of the present disclosure. Software code may be stored in the memory and executed by the processor. The memory may be implemented in the processor or outside the processor.

The embodiments of the present disclosure have been described above with reference to the accompanying drawings, but the present disclosure is not limited to the above specific embodiments. The above specific embodiments are merely illustrative but not restrictive. A person of ordinary skill in the art may make various variations under the enlightenment of the present disclosure without departing from the spirit of the present disclosure and the protection scope of the claims, and such variations shall all fall within the protection scope of the present disclosure.

What is claimed is:

1. A Power Headroom Report (PHR) reporting method, performed by a terminal, comprising:

reporting a PHR when a preset reporting trigger condition is satisfied, wherein the PHR comprises a Power Headroom (PH) of a network node, wherein the network node comprises a neighboring network node, or a local network node and a neighboring network node, wherein the reporting trigger condition includes at least one of the following:

a dual active protocol stack (DAPS) is configured;

configuration information of the neighboring network node changes; or a cell quality of a target cell satisfies a preset condition, the target cell including the cell of the neighboring network node.

2. The PHR reporting method according to claim 1, wherein:

the PH of the network node comprises a PH of an uplink of a target object in the network node, the target object comprises a serving cell or a Transmission Reception Point (TRP), and the target object satisfies at least one of the following:

the target object is in an activated state; or the uplink configured for the target object is associated with any Medium Access Control (MAC) entity.

3. The PHR reporting method according to claim 2, wherein the serving cell comprises a primary cell and a secondary cell when the terminal is in multiple PHR configuration; or the serving cell comprises a primary cell when the terminal is in single PHR configuration.

4. The PHR reporting method according to claim 2, wherein the PH satisfies any one of the following:

the PH is a difference between a maximum transmit power of the terminal and a transmit power of an uplink shared channel when there is Physical Uplink Shared Channel (PUSCH) transmission on the target object;

the PH is a difference between a maximum transmit power of the terminal and a transmit power of a Sounding Reference Signal (SRS) when there is SRS transmission on the target object; or the PH is a virtual PH when there is no PUSCH transmission and SRS transmission on the target object.

5. The PHR reporting method according to claim 1, wherein the PHR satisfies any one of the following:

a PH of one network node is reported in one PHR;

PHs of different network nodes are reported sequentially in a same PHR; or one PHR comprises a joint PH of N network nodes, N being an integer greater than 1.

6. The PHR reporting method according to claim 5, wherein when the PHR comprises PHs and $P_{CMAX,f,c}$ of at least two network nodes, when a PH of one network node is reported in one PHR or PHs of different network nodes are reported sequentially in a same PHR, a PH and $P_{CMAX,f,c}$ of each network node are reported in a preset order, wherein the $P_{CMAX,f,c}$ is a maximum transmit power supported by a carrier.

7. The PHR reporting method according to claim 6, wherein when PHs of different network nodes are reported sequentially in a same PHR, the reporting a PH and $P_{CMAX,f,c}$ of each network node in a preset order comprises any one of the following:

reporting a PH and $P_{CMAX,f,c}$ of one network node in the preset order, and then reporting a PH and $P_{CMAX,f,c}$ of a next network node; or reporting a $P_{CMAX,f,c}$ of each network node in the preset order after reporting a PH of each network node in the preset order.

8. The PHR reporting method according to claim 6, wherein the preset order satisfies at least one of the following:

reporting of a local network node takes precedence over reporting of a neighboring network node, or reporting of a neighboring network node takes precedence over reporting of a local network node; or reporting of the primary cell takes precedence over reporting of the secondary cell when a network node comprises a primary cell and a secondary cell.

9. The PHR reporting method according to claim 6, wherein in the preset order, an order of the neighboring network node is determined according to at least one of the following:

the identification information of the network node or related information of the identification information of the network node;

value of the PH;

value of the $P_{CMAX,f,c}$ ;

a quality of an uplink;

a value of a path loss;

a quality of a path loss reference signal;

a cell quality or a TRP quality;

a physical distance between a neighboring cell and a local cell;

TRP identification related information; or a physical distance between TRPs.

10. A terminal, comprising: a memory having a computer program stored thereon; and a processor, wherein the computer program, when executed by the processor, causes the processor to perform the PHR reporting method according to claim 1.

11. The PHR reporting method according to claim 1, wherein identification information of the neighboring network node comprised in the PHR is indicated by any one of the following:

a high layer signaling;

a physical layer signaling; or a configuration signaling that also indicates the neighboring network node has been configured, activated, or updated.

12. The PHR reporting method according to claim 11, wherein the configuration signaling that also indicates the neighboring network node has been configured, activated, or updated is indicated by at least one of the following signaling:

power control configuration signaling;

cell configuration signaling;

high layer measurement related signaling;

Channel State Information (CSI) related configuration signaling; or channel related configuration signaling.

13. A Power Headroom Report (PHR) receiving method, performed by a network device, comprising:

receiving a PHR reported by a terminal when a preset reporting trigger condition is satisfied, wherein the PHR comprises a Power Headroom (PH) of a network node, wherein the network node comprises a neighboring network node, or a local network node and a neighboring network node, wherein the reporting trigger condition includes at least one of the following:

a dual active protocol stack (DAPS) is configured;

configuration information of the neighboring network node changes; or a cell quality of a target cell satisfies a preset condition, the target cell including the cell of the neighboring network node.

14. The PHR receiving method according to claim 13, wherein the PH of the network node comprises a PH of an uplink of a target object in the network node, the target object comprises a serving cell or a Transmission Reception Point (TRP), and the target object satisfies at least one of the following:

the target object is in an activated state; or the uplink configured for the target object is associated with any Medium Access Control (MAC) entity.

15. The PHR receiving method according to claim 14, wherein the serving cell comprises a primary cell and a secondary cell when the terminal is in multiple PHR configuration; or the serving cell comprises a primary cell when the terminal is in single PHR configuration.

16. The PHR receiving method according to claim 14, wherein the PH satisfies any one of the following:

the PH is a difference between a maximum transmit power of the terminal and a transmit power of an uplink shared channel when there is Physical Uplink Shared Channel (PUSCH) transmission on the target object;

the PH is a difference between a maximum transmit power of the terminal and a transmit power of a Sounding Reference Signal (SRS) when there is SRS transmission on the target object; or the PH is a virtual PH when there is no PUSCH transmission and SRS transmission on the target object.

17. The method according to claim 13, wherein the PHR satisfies any one of the following:

a PH of one network node is reported in one PHR;

PHs of different network nodes are reported sequentially in a same PHR; or one PHR comprises a joint PH of N network nodes, N being an integer greater than 1.

18. A network device, comprising: a memory having a computer program stored thereon; and a processor, wherein the computer program, when executed by the processor, causes the processor to perform the PHR receiving method according to claim 13.

19. The PHR receiving method according to claim 13, wherein identification information of the neighboring network node comprised in the PHR is indicated by any one of the following:

a high layer signaling;

a physical layer signaling; or a configuration signaling that also indicates the neighboring network node has been configured, activated, or updated.

20. The PHR receiving method according to claim 19, wherein the configuration signaling that also indicates the neighboring network node has been configured, activated, or updated is indicated by at least one of the following signaling:

power control configuration signaling;

cell configuration signaling;

high layer measurement related signaling;

Channel State Information (CSI) related configuration signaling; or channel related configuration signaling.

* * * * *